Figure 1:
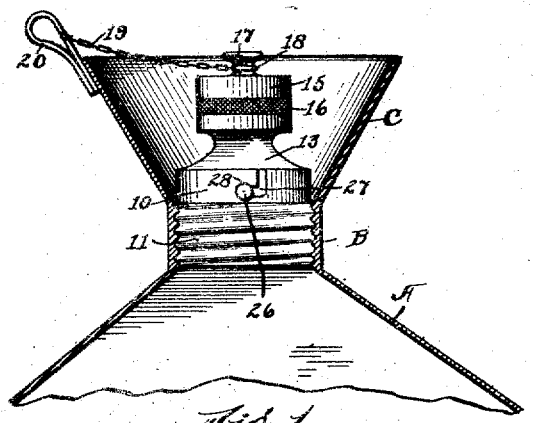

J. J. BOWES, Jr.

HOT WATER AND ICE BAG CLOSURE OR STOPPER.

APPLICATION FILED AUG. 2, 1919.

Reissued Jan. 25, 1921. 15,033.

Inventor,
John J. Bowes Jr.
By Thurston, Kerr & Hudson
Attys.

UNITED STATES PATENT OFFICE.

JOHN J. BOWES, JR., OF PENSACOLA, FLORIDA.

HOT-WATER AND ICE BAG CLOSURE OR STOPPER.

15,033. Specification of Reissued Letters Patent. Reissued Jan. 25, 1921.

Original No. 1,292,690, dated January 28, 1919, Serial No. 97,133, filed May 12, 1916. Application for reissue filed August 2, 1919. Serial No. 315,037.

*To all whom it may concern:*

Be it known that I, JOHN J. BOWES, JR., a citizen of the United States, residing at Pensacola, in the county of Escambia and the State of Florida, have invented a new and useful Improvement in Hot-Water and Ice Bag Closures or Stoppers, of which the following is a specification.

This invention relates to stoppers, and more particularly to the class of quick detachable stoppers for containers such as hot water and ice bags or the like.

The primary object of the invention is the provision of a stopper of this character wherein the employment of screw threads upon the stopper is eliminated and the same is securely locked in the mouth of a container to positively close the same against leakage and to permit the quick detaching of the stopper when the occasion requires.

Another object of the invention is the provision of a stopper of this character wherein the use of a disk washer is dispensed with as the same becomes worn by constant use and by reason of excessive screwing of the ordinary stopper used in hot water and ice bags for the closing thereof to avoid leakage, the stopper being of novel construction for the quick detachment and attachment thereof with dispatch.

A further object of the invention is the provision of a stopper of this character wherein the gasket or resilient ring is of a construction to permit the expansion thereof under the action of the contents of the bag or container and thus obviate any possibility of the leakage of the contents from the same when the bag or container is in use.

A still further object of the invention is the provision of a stopper of this character wherein the construction thereof permits the use of a flexible tube for converting the container or bag into a syringe, the tube being positively fastened in the stopper so as to obviate the pulling away of the tube therefrom irrespective of the strain exerted upon the tube.

A still further object of the invention is the provision of a stopper of this character wherein the same is formed with an outlet bore or passage and carries a removable cap, the bore also being designed to receive a flexible tube which can be readily and easily detachably fastened therein.

A still further object of the invention is provision of a stopper of this character which is simple in construction, thoroughly reliable and efficient in operation, strong, durable and inexpensive in manufacture.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claims.

Figure 2:
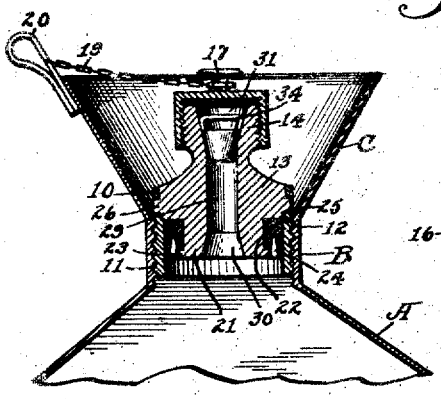
Figure 3:
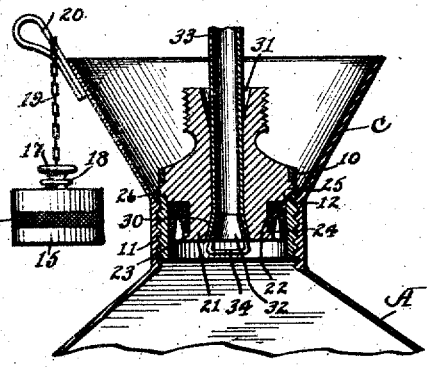
Figure 4:
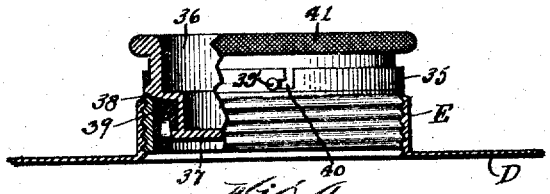

In the accompanying drawings:

Figure 1 is a fragmentary vertical longitudinal sectional view through a hot water bag showing the stopper constructed in accordance with the invention applied; Fig. 2 is a similar view showing the stopper in vertical sectional elevation; Fig. 3 is a view similar to Fig. 2 with the cap of the stopper removed and a portion of a flexible tube fastened in the stopper; Fig. 4 is a fragmentary sectional view through an ice bag showing a slight modification of stopper for use therewith, the stopper being partly in section.

Similar reference characters indicate corresponding parts throughout the several views of the drawing.

Referring to the drawing in detail, especially Figs. 1 to 3 thereof, A designates a portion of a hot water bag having the usual neck B and funned shaped mouth C, and within the neck is received the stopper hereinafter fully described.

The neck is lined with a ring 10 preferably made from metal and formed with external ribs 11 for a portion of its length, which are pressed in or engaged with the internal surface of the neck B for the permanent mounting of the lining therein. When in place the upper end of the lining protrudes a slight distance within the funnel mouth C as shown. The ring 10 beyond its threaded portion 11 has its internal diameter reduced and the annular shoulder 12 thus provided is flared for a purpose presently described.

Removably fitted within this lining is a stopper whose body 13 is formed with a reduced externally threaded outer end 14 for the detachable mounting thereon of a cap 15 which is externally knurled at 16 to permit the quick and easy application and removal of said cap, while on the top of the latter is formed a knob 17 with which loosely engages a ring 18 at one end of a flexible hanger 19, the same being also connected with a tab 20 on the funnel mouth C and in this manner the cap is prevented from becoming lost when removed from the stopper body 13, as will be clearly apparent.

The stopper body 13 has a portion which is adapted for insertion within the ring 10 and the portion which is thus adapted for insertion is provided with an external groove 22 having an end flange 23 and concentrically with respect to the groove 2 and seated within this groove is a packing ring or gasket 25. This gasket is preferably of substantially inverted U-shape having an inner wall which engages with the wall of the groove 22 and having an outer wall which is spaced from the inner wall, the outer wall being adapted to contact with and make a close fit with the inner wall of the ring 10 when the stopper body 13 is inserted therein. The free edges of these walls are preferably tapered.

The arrangement of the outer wall of the gasket with respect to the stopper body 13 and particularly with respect to the flange 23 is such that the open space between the wall of the gasket is in open communication with the interior of the container with which the stopper is associated, so that the liquid within the container may have free access to the space between the walls of the gasket.

As before stated, the outer wall of the gasket has a close fit with respect to the ring 10 so that when under any circumstances the liquid within the container contacts with the gasket, it enters the space between the walls of the gasket exerting a pressure outwardly upon these walls thereby pushing the walls of the gasket into more intimate contact with the portions of the ring 10 with which they engage and effectively preventing the passage of any liquid around the outside of the gasket and the greater the pressure exerted upon the gasket by the liquid, the more firmly and effectively does the gasket engage the wall of the groove 22 and the wall of the ring 10.

The stopper body 13 may be formed above its groove and gasket with an externally beveled annular shoulder 25 which cooperates with the shoulder 12 internally of the ring 10, when the stopper member is locked in position therein for closing the hot water bag.

The stopper is inserted within the ring 10 by a substantially lineal pushing-in movement, requiring but a slight amount of force to overcome the frictional engagement between the outer wall of the gasket and the inner wall of the ring 10. The stopper is held in its most inward position by any suitable means such as that shown in the drawing and about to be described.

Projecting from the stopper body 13 at diametrically opposite points thereof are pins 26 which are adapted to engage in L-shaped slots 27 formed in diametrically opposite points of the ring 10 and opening through the upper edge thereof, the inner ends of the slots 27 being formed with offset notches 28 forming seats for the pins 26 when the same have been inserted through the open ends of the slots 27 and the stopper body 13 turned within the ring 10 for the engagement of the pins 26 in the seats 28, thereby securely fastening the stopper body in place against accidental removal.

Formed axially through the stopper body 13 is a bore or passage 29 having flared ends 30 and 31 respectively, the end 31 being of greater extent than the end 30, and into either of the same is adapted to be received a hollow truncated conical shaped spreader member 32 which is adapted to be inserted in the end of a flexible tube 33 when passed through the bore 29 for the fastening of the said tube in the stopper body 13 in the flared end 30, as is clearly shown in Fig. 3 of the drawing, the spreader 32 being formed with a looped handle 34 to permit the conventient application and removal of said spreader to and from the tube 33, it being understood of course that when the tube 33 is inserted in the stopper body 13 it has been previously removed from the ring 10 in the neck of the bag. When the tube 33 is detached from the stopper body 13 the spreader may be placed within the flared end 31 of the bore 29 as is clearly shown in Fig. 2 of the drawing, and the cap 15 will prevent the loss of the said member held therein.

In Fig. 4 there is shown a slight modification of the invention, wherein D designates a portion of the body of an ice bag having the usual neck E in which is fitted the ring 35 constructed similarly to the ring 10, yet said ring 35 is of considerably greater diameter with respect thereto so as to permit introduction and removal of ice to and from the bag. This ring 35 is also fastened within the neck E similarly to the ring 10 in the neck B of the bag A, and detachably fitted within the ring 35 is the stopper which comprises a hollow substantially cup shaped body 36 formed with a reduced inner end 37 having an external channel or groove 38 to receive the expansible gasket 39 which is identical to the gasket 24, and this body 36 is fastened in the ring 35 through the medium of the pins 39′ and slots 40 carried by and formed in the body and ring respectively. The body 36 is formed at its outer end with a knurled external bead 41 to permit the convenient application and removal of the stopper, as will be obvious.

From the foregoing description, taken in connection with the accompanying drawings, the construction and operation of the herein described closure will be readily apparent and, therefore, a more extended explanation has been omitted.

Having described my invention, I claim

1. The combination with a member having a substantially straight inner wall and free from projections of a stopper body adapted for insertion within said member, a gasket carried by the said body, said gasket having a substantially straight side wall and of substantially the same diameter as the stopper body, said gasket engaging a seating against the side wall of the rim with a close fit and means for securing the stopper body with respect to said member.

2. The combination with a member having an inner wall of a stopper body adapted for insertion within said member, a gasket carried by said body, said gasket having a freely depending side wall which is adapted to engage with the said wall of the said member with a close fit, there being an open space behind the said depending wall of the gasket and means for securing the stopper body to the said member.

3. The combination with a member having a plain inner wall of a stopper body adapted for insertion within said member, the said stopper body being provided with a groove, a gasket in said groove, said gasket having a freely depending wall which is adapted to engage with the inner wall of the aforesaid member with a close fit, there being an open space behind the said depending wall of the gasket and means for securing the stopper body with respect to said member.

4. The combination with a member having a plain inner wall of a stopper body adapted for insertion within said member, a gasket carried by said body, said gasket having depending spaced walls, one of the gasket walls coöperating with the stopper body the other of said depending walls being adapted to engage with the inner wall of the aforesaid member with a close fit and means for securing the stopper body with respect to said member.

5. The combination with a member having a plain inner wall of a stopper body adapted for insertion within said member, said stopper body being provided with a groove and an extending flange at one end of said groove, a gasket occupying said groove, said gasket being provided with an outer depending wall, there being an open space behind said wall and the lower edge of the said depending wall being spaced with respect to the aforesaid flange on the body stopper, said gasket wall being adapted to engage the side wall of the aforesaid member with a close fit and means for securing the stopper body with respect to said member.

6. The combination with a member having a plain inner wall of a stopper body adapted for insertion within said member, said stopper body having a groove with an extending flange at one end of said groove, a gasket within said groove, said gasket having a depending wall, the lower edge of said wall being spaced with respect to the flange on the stopper body, the said wall of the gasket engaging with the inner wall of said member and means for securing the stopper body with respect to said member.

7. The combination with a member having a plain inner wall of a stopper body adapted for insertion within said member, said stopper body being provided with a groove and a flange at one end of said groove and gasket occupying the said groove, said gasket being provided with depending spaced walls, one of said walls engaging the said groove, the other of said walls having its lower edge spaced with respect to the said flange, the said wall of the gasket being adapted to engage the inner wall of the said member, and means for securing the stopper body with respect to the said member.

8. The combination with a liquid container having a member provided with a plain inner wall of a stopper body adapted for insertion within said member, a gasket carried by said body, said gasket having a depending wall adapted to engage and seat against the inner wall of the said member, there being an open space behind the said depending wall which is in open communication with the said liquid container whereby liquid may engage with said wall to expand it against its seat.

9. The combination with a liquid container having a member with a plain inner wall of a stopper body adapted for insertion within said member, a gasket surrounding a portion of said stopper body, said gasket having spaced depending walls, one of said walls engaging with the body portion, the other of said walls adapted to engage with and seat against the inner wall of the aforesaid member, the space between the said walls of the gasket being open with respect to the container whereby liquid may enter said space and expand the walls of said gasket to form a liquid tight joint.

10. The combination with a liquid container having a member provided with a plain inner wall of a stopper body adapted for insertion within said member, said stopper body being provided with a groove and a flange adjacent an end of the groove, a gasket having spaced depending walls, one of said walls occupying the groove in the stopper body, the other of said walls being adapted to engage and seat against the inner wall of the said member, the edge of the last mentioned wall being spaced with respect to the said flange on the stopper body whereby the space between the said walls is in open communication with the container whereby liquid within the container may have access to the space between the walls to expand the same and means for securing the stopper body with respect to the said member.

11. In a bag closure, a liner adapted to be fastened within the neck of the bag and having a bore with smooth portions of two diameters leaving an offset internal annular seating shoulder between them, in combination with a threadless stopper having a portion, the external diameter of which adapts it to fit into that portion of said bore of larger diameter and against said annular shoulder, said stopper also having a portion of smaller diameter formed with an external packing groove, a resilient packing ring seated and held in said groove and formed with an annular channel in that edge thereof which faces toward the interior of the bag and is directly exposed to the pressure of the contents thereof, and means for locking said stopper in said liner.

In testimony whereof I hereunto affix my signature.

JOHN J. BOWES, Jr.